2,748,142

DERIVATIVES OF N-HYDROXY PYRIDONES AND PROCESS OF PRODUCTION

Niels K. F. W. Clauson-Kaas, Haifa, Israel, and Niels Elming and Jorgen Tormod Nielsen, Copenhagen, Denmark, assignors to A/S Sadolin & Holmblad, Copenhagen, Denmark No Drawing. Application February 15, 1955, Serial No. 488,407

9 Claims. (Cl. 260—297)

This invention relates to, and has for its object the provision of, certain cyclic hydroxamic acids of the pyridine series, and a method of preparing them.

Prior to this invention, the cyclic hydroxamic acid

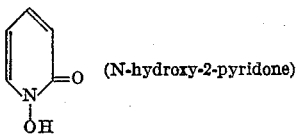

(N-hydroxy-2-pyridone)

had been prepared from 2-bromo-pyridine, and found to have antibacterial activity comparing favorably with the antibiotic aspergillic acid (U. S. Patent No. 2,540,218, dated February 6, 1951). The process employed for the preparation of that compound, however, did not lend itself to the commercially feasible preparation of advantageous derivatives of N-hydroxy-2-pyridone.

The compounds of this invention are those of the general formula

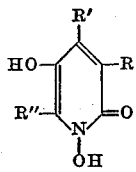

wherein R and R' are each a member of the group consisting of H and lower alkyl (preferably H), and R" is a 4–10 carbon atom hydrocarbon group (preferably a 6 carbon atom hydrocarbon group). These compounds have qualitatively the same antibacterial action as N-hydroxy-2-pyridone, and are used for the same purposes and in the same manner as the latter (with the concentration or dosage adjusted in accordance with relative activity). Thus, they may be used in the treatment of animals infected with organisms sensitive to N-hydroxy-2-pyridone; or they may be used to remove susceptible microorganisms from instruments and equipment, or in separating certain species of microorganisms from mixtures thereof with susceptible microorganisms.

As in the case of N-hydroxy-2-pyridone, the compounds of this invention may be in tautomeric equilibrium with the corresponding N-oxides, e. g.

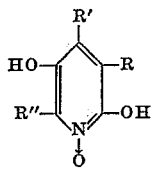

and it is intended that this N-oxide form be included when the N-hydroxy compound is named or shown hereinafter.

The compounds of this invention are readily prepared by reacting as ester of a furoic acid of the general formula

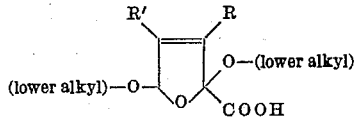

wherein R and R' have the meaning given hereinbefore (preferably a lower alkyl ester, such as the methyl ester), with a Grignard reagent of the general formula R"Mg(halogen) wherein R" has the meaning given hereinbefore (the halogen preferably being bromine), and treating the reaction product of the general formula

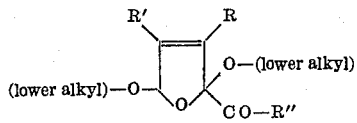

with hydroxylamine under hydrolyzing and condensing conditions.

The preferred starting materials for the purposes of this invention are the 2,5-dimethoxy-3-R-4-R'-2,5-dihydrofuroic acid esters; but analogously-obtained corresponding reactants with other 2,5-di(lower alkyl)-oxy substituents (e. g. ethoxy or propoxy) may be employed.

The following examples are illustrative of the invention.

Example 1

(a) An ethereal solution of n-hexylmagnesium bromide [from 36.0 g. (0.22 mole) n-hexyl bromide and 70 ml. ether] is added at —60° C. to a solution of 37.6 g. (0.20 mole) of 2,5-dimethoxy-2,5-dihydrofuroic acid methyl ester [Acta Chem. Scand. 6 (1952) 551] in 150 ml. ether. 32 ml. of a saturated solution of ammonium chloride is then added at 5° C., and the ethereal solution phase removed by decantation. The residue is extracted twice with 35 ml. ether; and the ethereal solutions are combined and distilled through a 5 cm. column. The distillation gives a forerun (about 13 g. boiling at about 68–157° C. 17 mm.) consisting mainly of the furoic ester starting material, then about 9.1 g. of 2,5-dimethoxy-2-(α-oxo-n-heptyl)-2,5-dihydrofuran as an almost colorless liquid boiling at about 157–159° C. 17 mm. $n_D^{25}$ 1.448. The product analyzes for $C_{11}H_{16}O_2$ $(OCH_3)_2$. About 15 ml. of a higher boiling residue, consisting mainly of the corresponding tertiary alcohol, remains in the flask.

(b) 1.21 g. (0.0050 mole) 2,5-dimethoxy-2-(α-oxo-n-heptyl)-2,5-dihydrofuran is dissolved in 3 ml. methanol, and the solution is added to a solution of 0.44 g. (0.0064 mole) hydroxylamine hydrochloride in methanol (3 ml.)-water (2.5 ml.). After standing for 17 hours, the light-brown reaction mixture is evaporated to dryness in vacuo from a water bath at 25° C. The residue is dissolved in 4.0 ml. of 20% ammonium hydroxide, and continuously extracted with ether; and the ethereal solution is evaporated to dryness and the residue crystallized from ether. About 126 mg. (about 12%) of 1,5-dihydroxy-6-(n-hexyl)-2-pyridone is obtained as almost white crystals melting at about 86–88° C. (Hershberg app., corrected). The crystals give a strong violet ferric chloride reaction, and analyze for $C_{11}H_{17}O_3N$.

Example 2

Replacement of the n-hexyl bromide in section a of Example 1 with an equimolar quantity of cyclohexyl bromide gives, in about 32% yield, 2,5-dimethoxy-2-α-oxo-α-(cyclohexyl)-methyl-2,5-dihydrofuran, as an almost colorless liquid boiling at 160–162° C. 14 mm, $n_D^{25}$ 1.4732. It analyzes for $C_{11}H_{14}O_2$ $(OCH_3)_2$.

(b) Replacement of the 2,5-dimethoxy-2-(α-oxo-n- heptyl)-2,5-dihydrofuran in section b of Example 1 with an equimolar quantity of 2,5-dimethoxy-2-α-oxo-α-(cyclohexyl)-methyl-2,5-dihydrofuran, and crystallization of the crude product from methanolether gives an about 27% yield of 1,5-dihydroxy-6-cyclohexyl-2-pyridone as almost white crystals melting at about 180-182° C. The product gives a strong violet ferric chloride reaction and analyzes for $C_{11}H_{15}O_3N$.

Replacement of the n-hexyl bromide in Example 1 with n-butyl bromide, n-amyl bromide, n-octyl bromide, n-decyl bromide or n-phenyl bromide, inter alia, yields the correspondingly R″-substituted intermediates and hydroxamic acids.

Replacement of the 2,5-dimethoxy-2,5-dihydrofuroic acid methyl ester in any of the foregoing examples by a 3 and/or 4-(lower alkyl)-substituted derivative thereof, e. g. the 3-methyl, the 3,4-dimethyl, the 4-isopropyl, or the 4-tertiary butyl substituted derivative, yields the correspondingly 3 and/or 4-substituted intermediates and hydroxamic acids. The 3 and/or 4-substituted starting materials are obtained analogously to the unsubstituted 2,5-dimethoxy-2,5-dihydrofuroic acid methyl ester, starting from the correspondingly 3 and/or 4-substituted furfurals, conversion of these furfurals to the corresponding 3 and/or 4-substituted furoic acids by the Cannizzaro reaction, and esterification and alkoxylation of these substituted furoic acids.

The pyridones obtained as described hereinbefore may be converted to the corresponding piperidones by high pressure hydrogenation in the presence of Raney nickel catalyst.

The invention may be variously otherwise embodied within the scope of the appended claims.

We claim:
1. A compound of the general formula

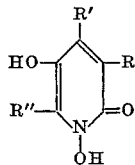

wherein R and R′ are each a member of the group consisting of H and lower alkyl, and R″ is a 4–10 carbon atom hydrocarbon group.

2. 1,5-dihydroxy-6-(n-hexyl)-2-pyridone.

3. 1,5-dihydroxy-6-cyclohexyl-2-pyridone.

4. A compound of the general formula

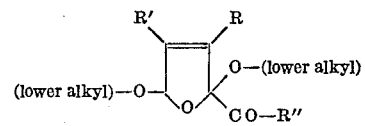

wherein R and R′ are each a member of the group consisting of H and lower alkyl, and R″ is a 4–10 carbon atom hydrocarbon group.

5. 2,5-dimethoxy-2-(α-oxo-n-heptyl)-2,5-dihydrofuran.

6. 2,5 - dimethoxy - 2 - α - oxo - α - (cyclohexyl)-methyl-2,5-dihydrofuran.

7. The method of preparing compounds of the general formula

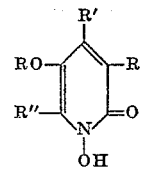

wherein R and R′ are each a member of the group consisting of H and lower alkyl, and R″ is a 4–10 carbon atom hydrocarbon group, which comprises reacting an ester of a furoic acid of the general formula

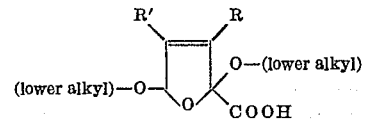

with a Grignard reagent of the general formula R″Mg-(halogen), R, R′ and R″ having the meaning given hereinbefore.

8. The method defined by claim 7, wherein the reaction product is treated with hydroxylamine under hydrolyzing and condensing conditions.

9. The method defined by claim 7, wherein the furoic ester reactant is 2,5-dimethoxy-2,5-dihydrofuroic acid methyl ester.

References Cited in the file of this patent
UNITED STATES PATENTS
2,515,304   Jones _____ July 18, 1950